(12) United States Patent
Dhungana et al.

(10) Patent No.: US 12,457,605 B2
(45) Date of Patent: Oct. 28, 2025

(54) DUAL CONNECTIVITY LIKE UL LEG SWITCHING WITH CARRIER AGGREGATION

(71) Applicant: Telefonaktiebolaget LM Ericsson (publ), Stockholm (SE)

(72) Inventors: Yamuna Dhungana, Stittsville (CA); Samir Shah, Ottawa (CA); Leonard Lightstone, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 396 days.

(21) Appl. No.: 18/033,130

(22) PCT Filed: Oct. 22, 2020

(86) PCT No.: PCT/IB2020/059936
§ 371 (c)(1),
(2) Date: Apr. 21, 2023

(87) PCT Pub. No.: WO2022/084724
PCT Pub. Date: Apr. 28, 2022

(65) Prior Publication Data
US 2024/0015733 A1    Jan. 11, 2024

(51) Int. Cl.
*H04W 72/543*  (2023.01)
*H04W 72/1268* (2023.01)

(52) U.S. Cl.
CPC ..... *H04W 72/1268* (2013.01); *H04W 72/543* (2023.01)

(58) Field of Classification Search
CPC ......... H04W 28/0278; H04W 72/1221; H04W 72/1268; H04W 72/21; H04W 72/23;
(Continued)

(56) References Cited

U.S. PATENT DOCUMENTS

| 10,986,695 | B1 * | 4/2021 | Babaei | H04W 76/36 |
| 2019/0098533 | A1 * | 3/2019 | Babaei | H04L 1/08 |

(Continued)

FOREIGN PATENT DOCUMENTS

| WO | 2020029292 A1 | 2/2020 | |
| WO | WO-2020167896 A1 * | 8/2020 | ............ H04W 72/21 |
| WO | WO-2021030674 A1 * | 2/2021 | .......... H04W 52/242 |

OTHER PUBLICATIONS

Author Unknown, "Technical Specification Group Radio Access Network; NR; Medium Access Control (MAC) protocol specification (Release 16)," Technical Specification 38.321, Version 16.0.0, Mar. 2020, 3GPP Organizational Partners, 141 pages.
(Continued)

*Primary Examiner* — Nathan S Taylor
(74) *Attorney, Agent, or Firm* — Withrow & Terranova, PLLC

(57) ABSTRACT

Systems and methods are disclosed herein for dynamic switching between legs in Carrier Aggregation (CA). In one embodiment, a method performed by a wireless communication device comprises operating to be configured for CA with a Primary Cell (PCell) and a Secondary Cell (SCell) and to configure a first Data Radio Bearer (DRB) associated to a first logical channel and a second DRB associated to a second logical channel. The method further comprises receiving a first parameter that restricts transmission for the first logical channel to the SCell and a second parameter that restricts transmission for the second logical channel to the PCell. The method further comprises receiving a dynamic indication that the SCell is deactivated, receiving an UL grant for the PCell, selecting data from either the first or second logical channel for transmission using the UL grant, regardless of the first and second parameters, and transmitting the selected data.

20 Claims, 12 Drawing Sheets

(58) Field of Classification Search
CPC ..... H04W 72/54; H04W 28/02; H04W 72/12; H04W 24/08; H04W 28/06; H04W 80/02; H04W 88/02; H04W 88/08; H04W 92/10; H04W 28/0252; H04W 28/0268; H04W 28/0925; H04W 28/0236; H04W 28/08
See application file for complete search history.

(56) References Cited

U.S. PATENT DOCUMENTS

| | | | |
|---|---|---|---|
| 2021/0105126 A1* | 4/2021 | Yi | H04L 5/0055 |
| 2021/0135946 A1* | 5/2021 | Babaei | H04L 1/1854 |
| 2021/0160873 A1* | 5/2021 | Shi | H04L 1/08 |
| 2021/0204309 A1* | 7/2021 | Babaei | H04L 5/0053 |
| 2021/0204344 A1* | 7/2021 | Babaei | H04W 80/02 |
| 2021/0227451 A1* | 7/2021 | Babaei | H04W 48/12 |
| 2021/0259040 A1* | 8/2021 | Babaei | H04W 72/23 |
| 2021/0377786 A1* | 12/2021 | Lee | H04W 72/23 |
| 2021/0385846 A1* | 12/2021 | Lee | H04W 28/0278 |

OTHER PUBLICATIONS

International Search Report and Written Opinion for International Patent Application No. PCT/IB2020/059936, mailed Jul. 20, 2021, 13 pages.

\* cited by examiner

DUAL CONNECTIVITY LIKE UL LEG SWITCHING WITH CARRIER AGGREGATION

This application is a 35 U.S.C. § 371 national phase filing of International Application No. PCT/IB2020/059936, filed Oct. 22, 2020, the disclosure of which is incorporated herein by reference in its entirety.

TECHNICAL FIELD

The present disclosure relates to Carrier Aggregation, CA, in a cellular communications system.

BACKGROUND

In Third Generation Partnership Project (3GPP) New Radio (NR), Dual Connectivity (DC) allows a User Equipment (UE) to utilize radio resources of multiple Component Carriers (CCs) from two cell groups, i.e., a Master Cell Group (MCG) and a Secondary Cell Group (SCG). For DC, the UE is configured with two independent Medium Access Control (MAC)/Radio Link Control (RLC) stacks, one for the MCG and another for the SCG. For a split radio bearer, the UE can be configured to transmit uplink (UL) Packet Data Convergence Protocol (PDCP) Protocol Data Units (PDUs) over: (a) both the MCG leg and the SCG leg thereby aggregating CCs to increase UE throughput or (b) over a single prioritized leg through Radio Resource Control (RRC) configuration of PDCP parameters primaryPath and ulDataSplitThreshold. For single leg uplink transmission, switching between the MCG leg and the SCG leg in non-static scenarios thus requires RRC signaling. For example, if the SCG leg is configured as the primary leg and the transmission performance of the SCG leg becomes worse than the MCG leg, the Master NR base station (MgNB) should RRC-reconfigure the primary leg of the radio bearer to the MCG leg.

For applications/scenarios where maximizing UE UL throughput is not the primary objective, single leg UL transmission with dynamic switching is more appropriate than aggregating the CCs for the following reasons:

1. Aggregating the CCs in a DC aggregation mode uses a complex network implementation as compared to single leg transmission in terms of UL resource allocation and packet reordering.
2. Aggregating the CCs in the DC aggregation mode results in inefficient utilization of UL resources due to lack of scheduling coordination between the MgNB and Secondary NR base station (SgNB).
3. When aggregating the CCs in the DC aggregation mode, additional PDCP reordering delays may occur when data is split between two legs. For latency sensitive applications, prioritizing the fastest leg over data split is thus preferable.
4. When aggregating CCs in the DC aggregation mode, delay skew is a problem due to propagation delay differences between two legs and inter-node latency.

Just like DC, Carrier Aggregation (CA) also intends to utilize radio resources from multiple CCs to increase UE throughput. However, DC and CA differ significantly in terms of implementation. Unlike DC, in CA, all the carriers are in a single cell group, and the UE is configured with single MAC entity.

At higher carrier frequencies, NR radio links are expected to undergo faster changes in throughput, as compared to that at lower carrier frequencies, due to potential blocking and fading. RRC-reconfiguration based UL leg switching in DC cannot enable a UE to quickly direct its UL transmission to the leg with the highest throughput due to significant delays involved with the required RRC signaling. The delay may lead to potential radio link failures before the switching happens. Thus, it becomes important to have a solution which allows faster adaptation of the leg used for UE transmission.

SUMMARY

Systems and methods are disclosed herein for dynamic switching between legs in Carrier Aggregation (CA). In one embodiment, a method performed by a wireless communication device for a cellular communications system comprises operating, together with a first base station, to be configured for CA with a Primary Cell (PCell) served by the first base station and a Secondary Cell (SCell) served by a second base station. The method further comprises operating, together with the first base station, to configure a first Data Radio Bearer (DRB) associated to a first logical channel and a second DRB associated to a second logical channel. The method further comprises receiving a first parameter that indicates that transmission for the first logical channel that is associated to the first DRB is restricted to the SCell and a second parameter that indicates that transmission for the second logical channel that is associated to the second DRB is restricted to the PCell. The method further comprises receiving an uplink (UL) grant for the SCell, selecting first data only from the first logical channel that is associated to the first DRB for transmission using the UL grant for the SCell in accordance with the first and second parameters, and transmitting the selected first data on the SCell in accordance with the UL grant for the SCell. The method further comprises receiving a dynamic indication that the SCell is deactivated for the wireless communication device, receiving an UL grant for the PCell, selecting second data from either the first logical channel that is associated to the first DRB or the second logical channel that is associated to the second DRB for transmission using the UL grant for the PCell, regardless of the first and second parameters, and transmitting the selected second data on the PCell in accordance with the UL grant for the PCell. In this manner, faster adaptation of the leg (i.e., cell) used for UL transmission to the leg with the highest throughput for a DRB is provided as compared to that provided using conventional Dual Connectivity (DC) leg switching, which relies on higher layer signaling.

In one embodiment, the dynamic indication that the SCell is deactivated for the wireless communication device serves as an implicit indication that a mapping restriction defined by the first and second parameters is lifted such that data from the first logical channel that is associated to the first DRB can be mapped to the PCell.

In one embodiment, the dynamic indication that the SCell is deactivated for the wireless communication device is comprised in a Medium Access Control (MAC) Control Element (CE).

In one embodiment, the first parameter is an allowedServingCells parameter for the first logical channel, and the second parameter is an allowedServingCells parameter for the second logical channel.

In one embodiment, the method further comprises receiving an indication that the SCell is activated for the wireless communication device. The method further comprises, after receiving the indication that the SCell is activated for the wireless communication device, receiving a second UL grant for the SCell, selecting third data only from the first logical channel that is associated to the first DRB for transmission using the second UL grant for the SCell in accordance with the first and second parameters, and transmitting the selected third data on the SCell in accordance with the second UL grant for the SCell. In one embodiment, the indication that the SCell is activated for the wireless communication device serves as an implicit indication that a mapping restriction defined by the first and second parameters is activated such that data from the first logical channel that is associated to the first DRB can only be mapped to the SCell.

Corresponding embodiments of a wireless communication device are also disclosed. In one embodiment, a wireless communication device for a cellular communications system is adapted to operate, together with a first base station, to be configured for CA with a PCell served by the first base station and a SCell served by a second base station. The wireless communication device is further adapted to operate, together with the first base station, to configure a first DRB associated to a first logical channel and a second DRB associated to a second logical channel. The wireless communication device is further adapted to receive a first parameter that indicates that transmission for the first logical channel that is associated to the first DRB is restricted to the SCell and a second parameter that indicates that transmission for the second logical channel that is associated to the second DRB is restricted to the PCell. The wireless communication device is further adapted to receive an UL grant for the SCell, select first data only from the first logical channel that is associated to the first DRB for transmission using the UL grant for the SCell in accordance with the first and second parameters, and transmit the selected first data on the SCell in accordance with the UL grant for the SCell. The wireless communication device is further adapted to receive a dynamic indication that the SCell is deactivated for the wireless communication device, receive an UL grant for the PCell, select second data from either the first logical channel that is associated to the first DRB or the second logical channel that is associated to the second DRB for transmission using the UL grant for the PCell, regardless of the first and second parameters, and transmit the selected second data on the PCell in accordance with the UL grant for the PCell.

In one embodiment, a wireless communication device for a cellular communications system comprises one or more transmitters, one or more receivers, and processing circuitry associated with the one or more transmitters and the one or more receivers. The processing circuitry is configured to cause the wireless communication device to operate, together with a first base station, to be configured for CA with a PCell served by the first base station and a SCell served by a second base station. The processing circuitry is further configured to cause the wireless communication device to operate, together with the first base station, to configure a first DRB associated to a first logical channel and a second DRB associated to a second logical channel. The processing circuitry is further configured to cause the wireless communication device to receive a first parameter that indicates that transmission for the first logical channel that is associated to the first DRB is restricted to the SCell and a second parameter that indicates that transmission for the second logical channel that is associated to the second DRB is restricted to the PCell. The processing circuitry is further configured to cause the wireless communication device to receive an UL grant for the SCell, select first data only from the first logical channel that is associated to the first DRB for transmission using the UL grant for the SCell in accordance with the first and second parameters, and transmit the selected first data on the SCell in accordance with the UL grant for the SCell. The processing circuitry is further configured to cause the wireless communication device to receive a dynamic indication that the SCell is deactivated for the wireless communication device, receive an UL grant for the PCell, select second data from either the first logical channel that is associated to the first DRB or the second logical channel that is associated to the second DRB for transmission using the UL grant for the PCell, regardless of the first and second parameters, and transmit the selected second data on the PCell in accordance with the UL grant for the PCell.

Embodiments of a method performed by a first base station are also disclosed. In one embodiment, a method performed by a first base station for a cellular communications system comprises operating, together with a wireless communication device, to configure the wireless communication device for CA with a PCell served by the first base station and a SCell served by a second base station. The method further comprises operating, together with the wireless communication device, to configure the wireless communication device with a first DRB associated to a first logical channel and a second DRB associated to a second logical channel. The method further comprises sending, to the wireless communication device, a first parameter that indicates that transmission for the first logical channel that is associated to the first DRB is restricted to the SCell and a second parameter that indicates that transmission for the second logical channel that is associated to the second DRB is restricted to the PCell. The method further comprises determining that a link quality for the wireless communication device on the SCell is less than a predefined link quality threshold and, responsive to determining that the link quality for the wireless communication device on the SCell is less than the predefined link quality threshold, sending, to the wireless communication device, a dynamic indication that the SCell is deactivated for the wireless communication device. The dynamic indication that the SCell is deactivated for the wireless communication device is an implicit indication that transmission of data on the PCell can be either data for the first DRB or data for the second DRB regardless of the first and second parameters.

In one embodiment, the method further comprises, while the SCell is deactivated, sending, to the wireless communication device, an UL grant for the PCell, where transmission of data on the PCell responsive to the UL grant for the PCell can be either data for the first DRB or data for the second DRB regardless of the first and second parameters.

In one embodiment, the dynamic indication that the SCell is deactivated for the wireless communication device is comprised in a MAC CE.

In one embodiment, the first parameter is an allowedServingCells parameter for the first logical channel, and the second parameter is an allowedServingCells parameter for the second logical channel.

In one embodiment, the method further comprises determining that a link quality for the wireless communication device on the SCell is greater than a predefined link quality threshold and, responsive to determining that the link quality for the wireless communication device on the SCell is greater than the predefined link quality threshold, sending, to the wireless communication device, a dynamic indication that the SCell is activated for the wireless communication device. The dynamic indication that the SCell is activated for the wireless communication device is an implicit indication that transmission for the first logical channel that is associated to the first DRB is restricted to the SCell in accordance with the first parameter and that transmission for the second logical channel that is associated to the second DRB is restricted to the PCell in accordance with the second parameter.

Corresponding embodiments of a first base station are also disclosed. In one embodiment, a first base station for a cellular communications system is adapted to operate, together with a wireless communication device, to configure the wireless communication device for CA with a PCell served by the first base station and a SCell served by a second base station. The first base station is further adapted to operate, together with the wireless communication device, to configure the wireless communication device with a first DRB associated to a first logical channel and a second DRB associated to a second logical channel. The first base station is further adapted to send, to the wireless communication device, a first parameter that indicates that transmission for the first logical channel that is associated to the first DRB is restricted to the SCell and a second parameter that indicates that transmission for the second logical channel that is associated to the second DRB is restricted to the PCell. The first base station is further adapted to determine that a link quality for the wireless communication device on the SCell is less than a predefined link quality threshold and, responsive to determining that the link quality for the wireless communication device on the SCell is less than the predefined link quality threshold, send, to the wireless communication device, a dynamic indication that the SCell is deactivated for the wireless communication device. The dynamic indication that the SCell is deactivated for the wireless communication device is an implicit indication that transmission of data on the PCell can be either data for the first DRB or data for the second DRB regardless of the first and second parameters.

In one embodiment, a first base station for a cellular communications system comprises processing circuitry configured to cause the first base station to operate, together with a wireless communication device, to configure the wireless communication device for CA with a PCell served by the first base station and a SCell served by a second base station. The processing circuitry is further configured to cause the first base station to operate, together with the wireless communication device, to configure the wireless communication device with a first DRB associated to a first logical channel and a second DRB associated to a second logical channel. The processing circuitry is further configured to cause the first base station to send, to the wireless communication device, a first parameter that indicates that transmission for the first logical channel that is associated to the first DRB is restricted to the SCell and a second parameter that indicates that transmission for the second logical channel that is associated to the second DRB is restricted to the PCell. The processing circuitry is further configured to cause the first base station to determine that a link quality for the wireless communication device on the SCell is less than a predefined link quality threshold and, responsive to determining that the link quality for the wireless communication device on the SCell is less than the predefined link quality threshold, send, to the wireless communication device, a dynamic indication that the SCell is deactivated for the wireless communication device. The dynamic indication that the SCell is deactivated for the wireless communication device is an implicit indication that transmission of data on the PCell can be either data for the first DRB or data for the second DRB regardless of the first and second parameters.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
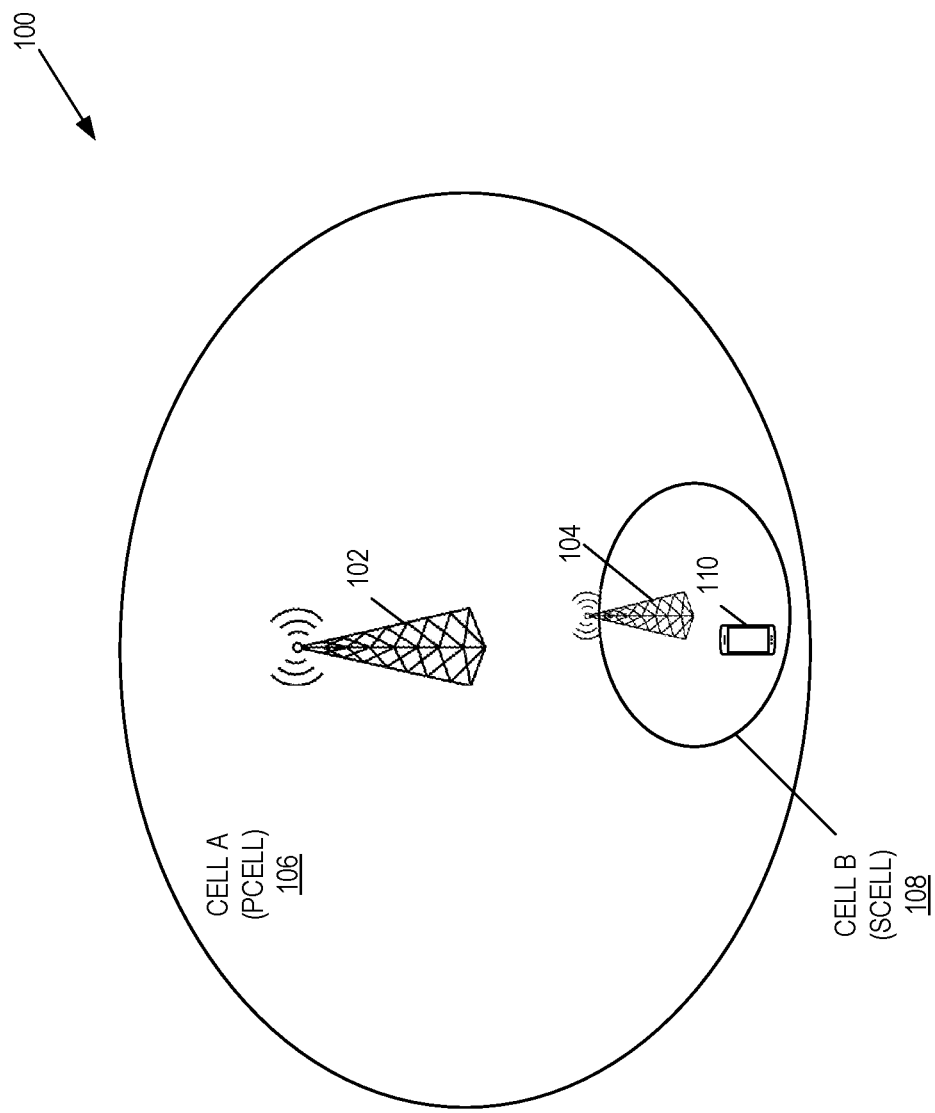
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

At higher carrier frequencies, NR radio links are expected to undergo faster changes in throughput, as compared to that at lower carrier frequencies, due to potential blocking and fading. Radio Resource Control (RRC) reconfiguration based uplink (UL) leg switching in Dual Connectivity (DC) cannot enable a UE to quickly direct its UL transmission to the leg with the highest throughput due to significant delays involved with the required RRC signaling. The delay may lead to potential radio link failures before the switching happens. Thus, it becomes important to have a solution which allows faster adaptation of the leg used for UE transmission.

The above problem can be solved with UL Carrier Aggregation (CA). Although CA in general requires tight scheduling coordination between the radio access nodes with a low latency connection between them, the additional flexibility introduced in NR can be utilized to configure UL CA such that a radio bearer can preferentially be directed to either the Primary Cell (PCell) or the Secondary Cell (SCell) only, hence effectively emulating UL DC like behavior. However, unlike DC, in this solution, bearer direction can be changed more dynamically with Medium Access Control (MAC) Control Element (CE) signaling.

While not being limited to or by any particular advantage, embodiments of the present disclosure may provide one or more of the following advantages. Embodiments of the present disclosure may provide faster adaptation of the leg (i.e., cell) used by the UE for UL transmission to the leg with the highest throughput for a radio bearer, hence maximizing performance. Embodiments of the present disclosure may also reduce radio link failures, particularly as compared to when DC is used, e.g., at high carrier frequencies.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN). In this example, the NG-RAN includes base stations 102 and 104, which in the NG-RAN are gNBs, controlling corresponding cells 106 (also referred to herein as Cell A) and 108 (also referred to herein as Cell B). The base stations 102 and 104 provide service to a wireless communication devices 110. The wireless communication device 110 is also sometimes referred to herein as a UE. In the embodiments described herein, the wireless communication device 110 is configured for CA where, in this example, cell 106 (i.e. cell A) is the PCell of the wireless communication device 110 and therefore sometimes referred to herein as PCell 106 and the cell 108 (i.e., Cell B) is the SCell of the wireless communication device 110 and therefore sometimes referred to herein as SCell 108.

As described herein, the wireless communication device 110 is configured with mapping restrictions for logical channels at the Medium Access Control (MAC) entity configured for CA, which restrict the mapping of data to the link for the PCell or the link for the SCell so as to emulate DC single leg operation. Further, switching between the link for the PCell and the link for the SCell is controlled via dynamic signaling (e.g., MAC CE signaling), rather than RRC signaling, such that this switching is performed much more quickly than switching between legs in DC single leg operation.

Before providing a more detailed discussion of an embodiment of the present disclosure, a description of a particular scenario is beneficial. Consider a scenario where the wireless communication device 110 is in the coverage of the cell 106 (i.e., Cell A) and the cell 108 (i.e., Cell B) of base stations 102 and 104, respectively. Cell A has larger coverage area than Cell B. Cell B, on the other hand, has larger bandwidth compared to cell A, and thus offers higher throughput in good radio conditions. Also assume that the wireless communication device 110 has two DRBs configured—DRB1 (best effort type bearer for services like Internet) and DRB2 (for low rate delay sensitive service like voice). Two possible UL configurations are considered below for this scenario. In particular, DC and CA and how CA can be configured to emulate DC like behavior with faster switching between links are considered.

Figure 2:
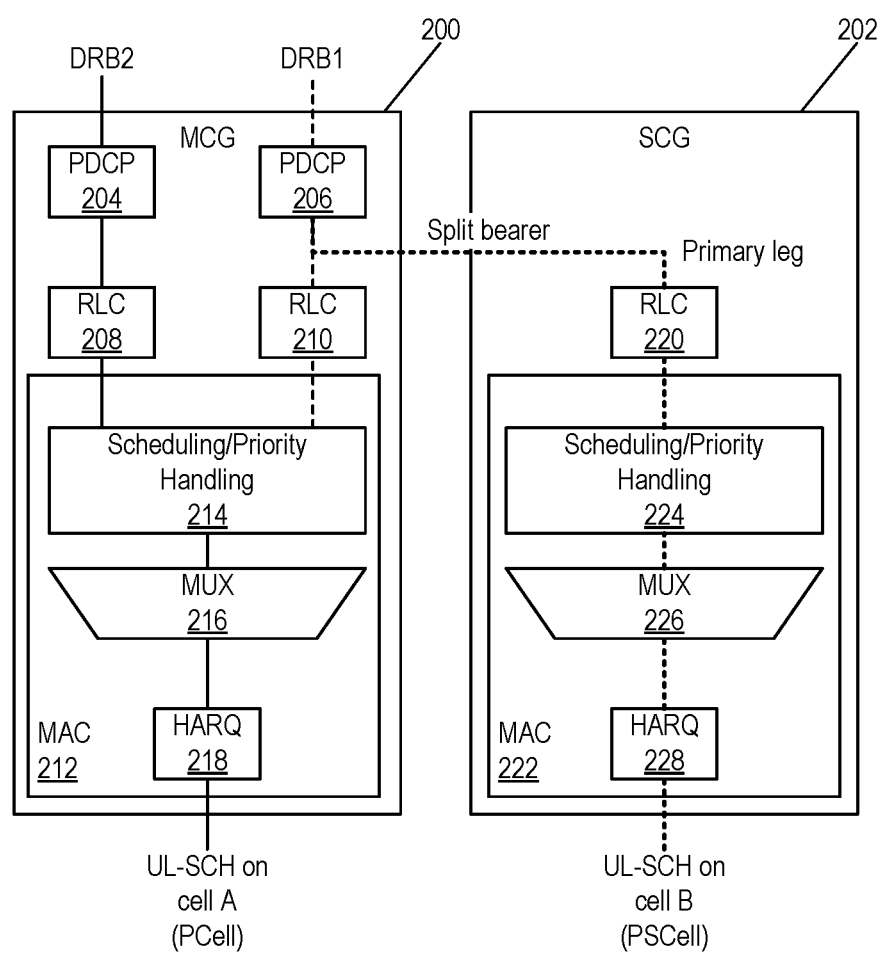
FIG. 2 illustrates separate Medium Access Control (MAC)/Radio Link Control (RLC) protocol stacks at the User Equipment (UE) for New Radio (NR) Uplink (UL) Dual Connectivity (DC)

DC: Consider a scenario in which the wireless communication device 110 is configured with NR-DC with Cell A as the PCell (Cell A due to its large coverage serves better as anchor cell) and Cell B as the Primary SCell (PSCell). If it is assumed that only NR-DC is configured with no CA, the Master Cell Group (MCG) consists of only Cell A and the Secondary Cell Group (SCG) consists of only Cell B. DRB1 of the wireless communication device 110 is configured as a split bearer with leg switching, whereas DRB2 of the wireless communication device 110 is configured as MCG bearer. As illustrated in FIG. 2, for NR-DC, the UE 110 is configured with separate protocol stacks 200 and 202 for the MCG and the SCG. The MCG protocol stack 200 includes:
  PDCP entities 204 and 206 for DRB2 and DRB1, respectively;
  RLC entities 208 and 210 for DRB2 and DRB1, respectively; and
  a MAC entity 212 including a scheduling/priority handling function 214, a Multiplexing (MUX) function 216, and a Hybrid Automatic Repeat Request (HARQ) function 218.
Similarly, the SCG protocol stack 202 includes:
  the PDCP entity 206 for DRB1;
  RLC entity 220 for DRB1; and
  a MAC entity 222 including a scheduling/priority handling function 224, a MUX function 226, and a HARQ function 228.
As illustrated in FIG. 2, given that Cell B offers higher throughput than Cell A in good radio conditions, the SCG leg of the split bearer is RRC configured as the primary leg during bearer setup. When the SCG link gets worse than the MCG link due to fading or other conditions, the MCG signals the wireless communication device 110 through RRC connection reconfiguration to configure the MCG leg as the new primary leg. Similarly, when the MCG link gets worse than that of the SCG, the MCG reconfigures the primary leg of the wireless communication device 110 back to the SCG leg. However, there's significant RRC reconfiguration delay involved while switching between the legs.

CA: In accordance with one example embodiment of the present disclosure, instead of NR-DC, the wireless communication device 110 is configured with UL CA with Cell A as the PCell and Cell B as the SCell. The wireless communication device 110 has DRB1 and DRB2 configured like in the DC case. Looking at FIG. 3, a protocol stack 300 of the wireless communication device 110 for CA includes:
  PDCP entities 302 and 304 for DRB1 and DRB2, respectively;
  RLC entities 306 and 308 for DRB1 and DRB2, respectively; and
  a MAC entity 310 including a scheduling/priority handling function 312, a MUX function 314, and a HARQ function 314.

Figure 3:
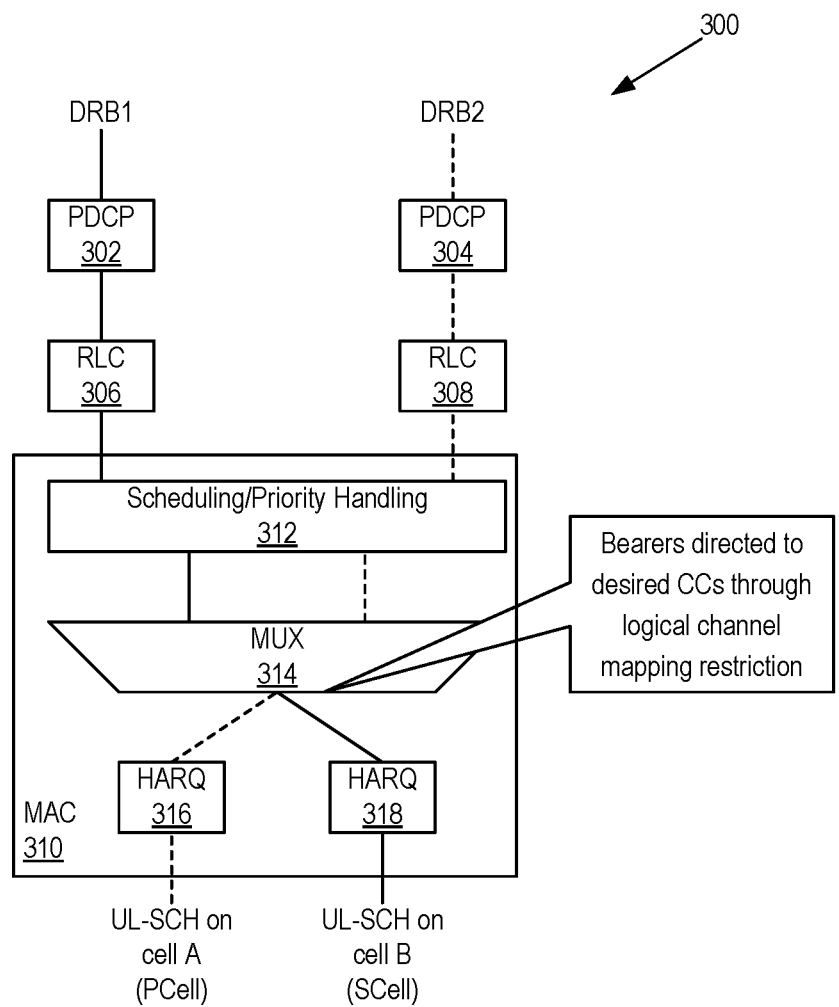
FIG. 3 illustrates a UE side protocol stack for UL Carrier Aggregation (CA) in which the MAC entity can be configured to apply restrictions on transmission of data for different data radio bearers, DRBs, in such a manner as to emulate NR-DC with switching of the leg used for single-leg transmission in accordance with an embodiment of the present disclosure.

Unlike DC where the wireless communication device 110 has two independent MAC/RLC stacks for Cell A (MCG) and Cell B (SCG) as shown in FIG. 2, the wireless communication device 110 has a single MAC entity 310 in CA for all bearers as shown in FIG. 3. Priority handling in the MAC entity 310 decides how data from DRBs is to be multiplexed for a given UL grant. Typically in UL CA, data of each DRB can be mapped to any UL Shared Channel (UL-SCH), i.e., UL-SCH on Cell A or UL-SCH on Cell B, which means tight scheduling coordination is needed between base stations 102 and 104, unlike DC with two independent schedulers.

In NR, additional flexibility to configure mapping restrictions for each logical channel in the MAC priority handler has been introduced. This flexibility is provided by configurable parameters such as, e.g., allowedSCS-List which indicates a set of allowed sub-carrier spacings for transmission and allowedServingCells which indicates a set of serving cells to which transmission is allowed. Only those logical channels which satisfy such conditions are eligible for multiplexing in a given UL grant. Embodiments of the present disclosure utilize the parameter allowedServingCells to emulate DC behavior with UL CA.

In order to emulate DC behavior with UL CA using the parameter allowedServingCells, during bearer setup and configuration, a logical channel (e.g., CCCH, DTCH, or DCCH) corresponding to DRB1 (i.e., the DRB that would be configured as split bearer in NR-DC case) is configured with allowedServingCells to allow transmission only to Cell B. Similarly, a logical channel (e.g., CCCH, DTCH, or DCCH) corresponding to DRB2 (i.e., the DRB that would be configured as MCG bearer in NR-DC) is configured with allowedServingCells to allow transmission only to Cell A. For an UL grant corresponding to UL-SCH on Cell A, the MAC entity 310 selects data only from DRB2 for transmission on the UL-SCH for Cell A in accordance with the configuration of allowedServingCells for Cell A and Cell B. Similarly, for an UL grant corresponding to UL-SCH on Cell B, the MAC entity 310 selects only data from DRB1 for transmission on the UL-SCH for Cell B in accordance with the configuration of allowedServingCells for Cell A and Cell B. This way, the DRBs are preferentially directed to only one of the two UL-SCHs, thus avoiding the need for tight scheduling coordination between the base stations 102 and 104.

Thus, just like if NR-DC were used where data from DRB1 is sent only to UL-SCH on Cell B when the primary path is set to the SCG, here in UL CA with mapping restrictions, data from DRB1 goes only to UL-SCH on Cell B. When the link corresponding to Cell B gets worse than a threshold (e.g., worse than that of Cell A), Cell B is deactivated with a MAC CE. After Cell B gets deactivated and is no longer a serving cell of the wireless communication device 110, the mapping restriction for DRB1 is implicitly lifted, and data from DRB1 can be sent on the UL-SCH on Cell A. When Cell B link quality gets better, Cell B is activated with a MAC CE, and the configured mapping restrictions become applicable with DRB1 directed to Cell B again. With MAC CE based activation and deactivation of Cell B, together with defined mapping restrictions in the logical channel configurations, leg switching behavior of DC can be effectively emulated using CA. However, importantly, the switching between legs happens at a much faster rate as RRC reconfiguration is not required.

Figure 4A:
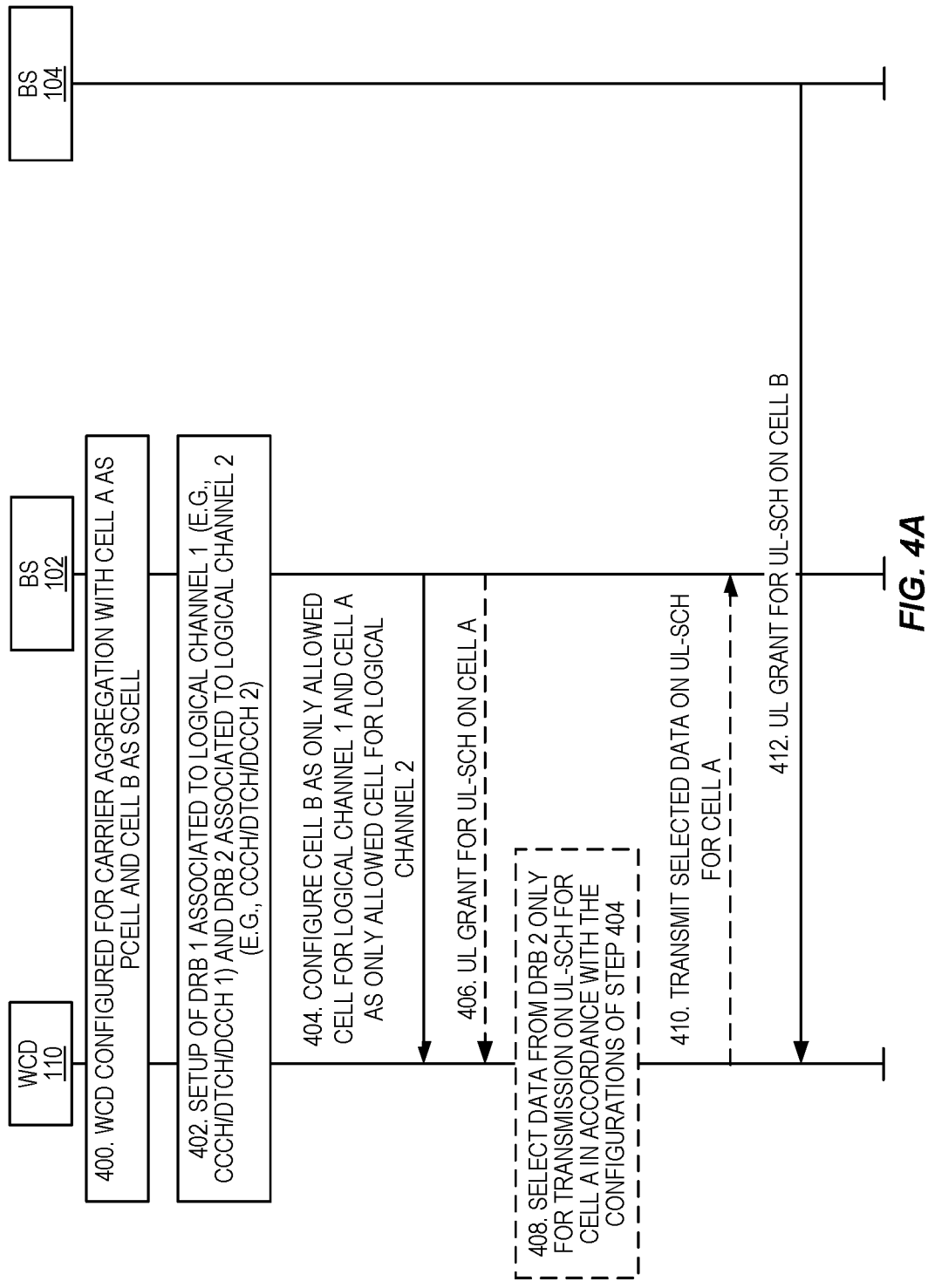
FIGS. 4A through 4C illustrate the operation of a wireless communication device and base stations to provide CA with dynamic switching of the leg used for single-leg transmission in accordance with an embodiment of the present disclosure.
Figure 4B:
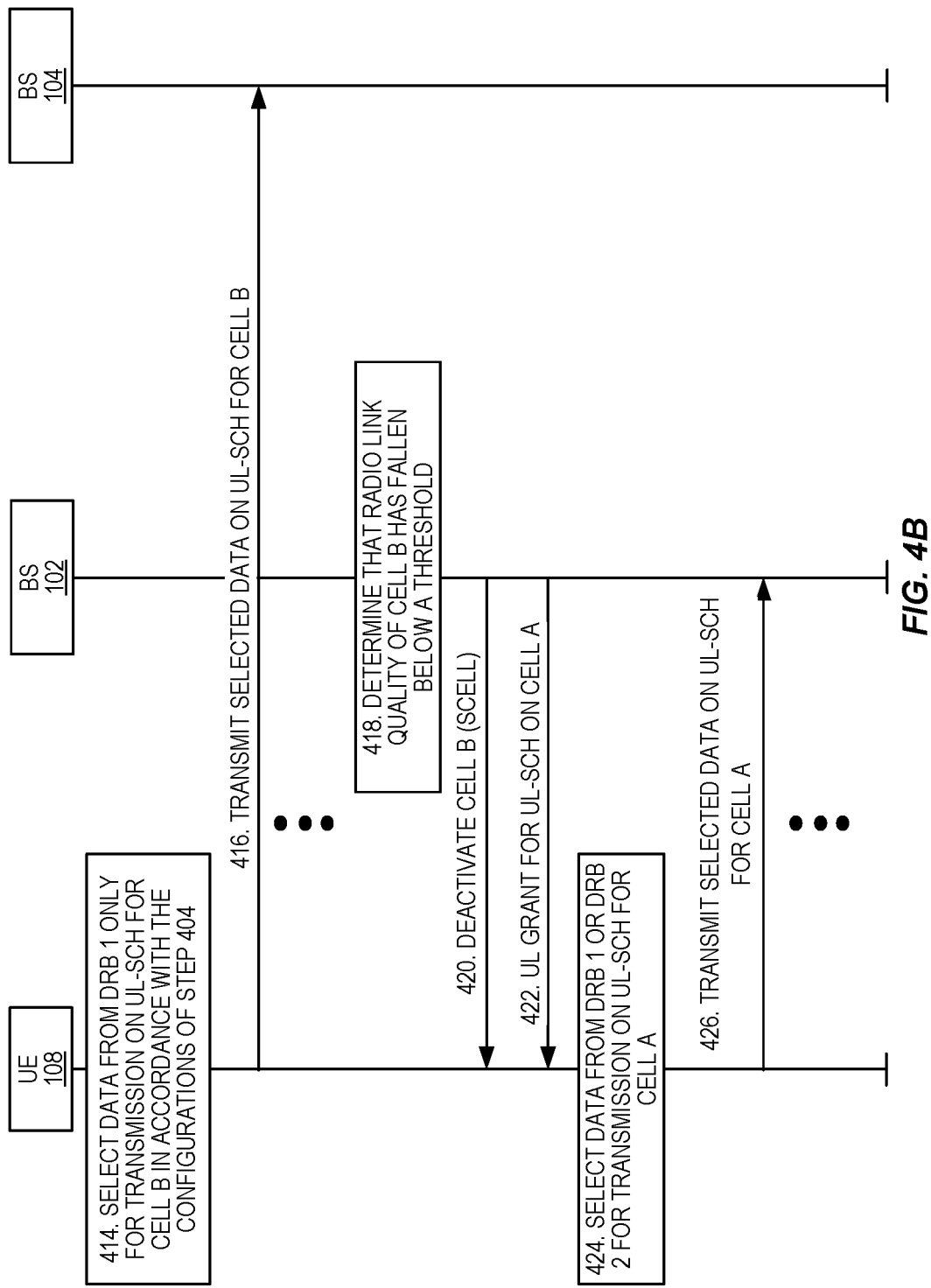
Figure 4C:
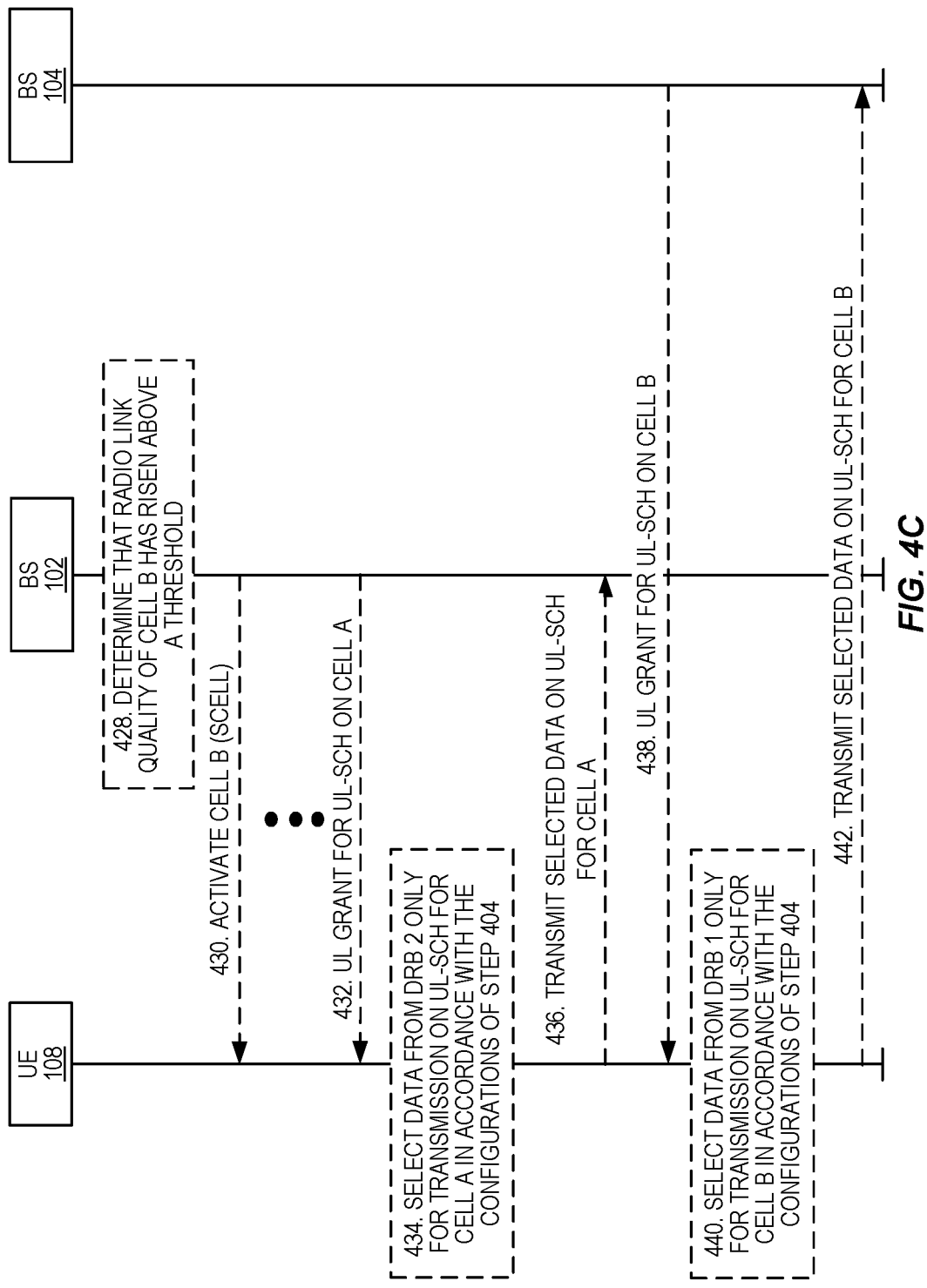

FIGS. 4A through 4C illustrate the operation of the wireless communication device 112 and the base stations 102 and 104 to provide a dynamic switching, single-leg mode of operation using CA in accordance with one embodiment of the present disclosure. As illustrated, the wireless communication device 110 is configured, by the network (e.g., by the base station 102), for CA with the cell 106 (Cell A) as the PCell and the cell 108 (Cell B) as the SCell (step 400). The wireless communication device 110 and, in this example, the base station 102 interact to setup and configure DRB1 and DRB2, where DRB1 is associated to, or corresponds to, a first logical channel (logical channel 1) and DRB2 is associated to, or corresponds to, a second logical channel (logical channel 2) (step 402). The type of logical channel may vary depending on the particular scenario. Examples of logical channels in NR are CCCH, DTCH, and DCCH. The network, and in this example the base station 102, configures a parameter (e.g., allowedServingCells) for logical channel 1 that indicates that transmission for logical channel 1 (and thus DRB1) is only allowed on Cell B and a parameter (e.g., allowedServingCells) for logical channel 2 that indicates that transmission for logical channel 2 (and thus DRB2) is only allowed on Cell A (step 404). These parameters are, in this example, higher-layer configured (e.g., via RRC signaling).

Sometime thereafter, the base station 102 sends, and the wireless communication device 110 receives, an UL grant for the UL-SCH on Cell A (step 406). For the UL grant, the wireless communication device 110, and in particular the MAC entity 310 of the wireless communication device 110, selects data from only DRB2 for transmission on the UL-SCH on Cell A in accordance with the configuration of the parameter that indicates that transmission for logical channel 2 (which corresponds to DRB2) is only allowed on Cell A and the parameter that indicates that transmission for logical channel 1 (which corresponds to DRB1) is only allowed on Cell B (step 408). The wireless communication device 110 transmits the selected data from DRB2 on the UL-SCH on Cell A in accordance with the UL grant (step 410).

The base station 104 sends, and the wireless communication device 110 receives, an UL grant for the UL-SCH on Cell B (step 412). Note that this UL grant may alternatively be sent by the base station 102. For the UL grant, the wireless communication device 110, and in particular the MAC entity 310 of the wireless communication device 110, selects data from only DRB1 for transmission on the UL-SCH on Cell B in accordance with the configuration of the parameter that indicates that transmission for logical channel 2 (which corresponds to DRB2) is only allowed on Cell A and the parameter that indicates that transmission for logical channel 1 (which corresponds to DRB1) is only allowed on Cell B (step 414). The wireless communication device 110 transmits the selected data from DRB1 on the UL-SCH on Cell B in accordance with the UL grant (step 416). Note that while, in this example, there are UL grants for both Cell A and Cell B, in actual operation there may be any number of zero or more UL grants for Cell A and any number of zero or more UL grants for Cell B.

At some time thereafter, the network, and in this example the base station 102, determines that a link quality for the uplink between the wireless communication device 110 and Cell B has fallen below a threshold quality level (e.g., the link quality for the uplink to Cell B has fallen below the link quality for the uplink to Cell A) (step 418). The link quality may be obtained in any desired manner. For example, the link quality may be obtained based on measurements such as, e.g., Reference Signal Received Power (RSRP) measurements and/or Reference Signal Received Quality (RSRP) measurements, which may be made at the wireless communication device 110 and reported to the base station 102 or made at the base station 102.

In response to determining that the link quality for the uplink between the wireless communication device 110 and Cell B has fallen below the threshold quality level, the network, and in this example the base station 102, sends a message to the wireless communication device 110 that indicates that Cell B is deactivated (step 420). More specifically, in one embodiment, the base station 102 sends a MAC CE to the wireless communication device 110 that indicates that Cell B is deactivated. By deactivating Cell B, the base station 102 implicitly instructs the wireless communication device 110 to not apply the restrictions indicated by the parameters configured in step 404 such that data from both DRB1 and DRB2 can be transmitted on the UL-SCH for Cell A.

Sometime thereafter, the base station 102 sends, and the wireless communication device 110 receives, an UL grant for the UL-SCH for Cell A (step 422). For the UL grant, the wireless communication device 110, and in particular the MAC entity 310 of the wireless communication device 110, selects data from either DRB1 or DRB2 for transmission on the UL-SCH on Cell A since Cell B has been deactivated and is no longer a serving cell of the wireless communication device 110. The wireless communication device 110 transmits the selected data from DRB1 on the UL-SCH on Cell B in accordance with the UL grant (step 424).

Sometime thereafter, the network, and in this example the base station 102, determines that the link quality for the uplink between the wireless communication device 110 and Cell B has risen above a threshold quality level (e.g., the link quality for the uplink to Cell B has risen above the link quality for the uplink to Cell A) (step 426). In response to determining that the link quality for the uplink between the wireless communication device 110 and Cell B has risen above the threshold quality level, the network, and in this example the base station 102, sends a message to the wireless communication device 110 that indicates that Cell B is activated (step 428). More specifically, in one embodiment, the base station 102 sends a MAC CE to the wireless communication device 110 that indicates that Cell B is activated. By activating Cell B, the base station 102 implicitly instructs the wireless communication device 110 to apply the restrictions indicated by the parameters configured in step 404 such that data from DRB1 can only be transmitted on the UL-SCH for Cell B and data for DRB2 can only be transmitted on the UL-SCH for Cell A. The process then proceeds as described above.

For example, sometime thereafter, the base station 102 sends, and the wireless communication device 110 receives, an UL grant for the UL-SCH on Cell A (step 432). For the UL grant, the wireless communication device 110, and in particular the MAC entity 310 of the wireless communication device 110, selects data from only DRB2 for transmission on the UL-SCH on Cell A in accordance with the configuration of the parameter that indicates that transmission for logical channel 2 (which corresponds to DRB2) is only allowed on Cell A and the parameter that indicates that transmission for logical channel 1 (which corresponds to DRB1) is only allowed on Cell B (step 434). The wireless communication device 110 transmits the selected data from DRB2 on the UL-SCH on Cell A in accordance with the UL grant (step 436).

The base station 104 sends, and the wireless communication device 110 receives, an UL grant for the UL-SCH on Cell B (step 438). Note that this UL grant may alternatively be sent by the base station 104. For the UL grant, the wireless communication device 110, and in particular the MAC entity 310 of the wireless communication device 110, selects data from only DRB1 for transmission on the UL-SCH on Cell B in accordance with the configuration of the parameter that indicates that transmission for logical channel 2 (which corresponds to DRB2) is only allowed on Cell A and the parameter that indicates that transmission for logical channel 1 (which corresponds to DRB1) is only allowed on Cell B (step 440). The wireless communication device 110 transmits the selected data from DRB1 on the UL-SCH on Cell B in accordance with the UL grant (step 442).

Figure 5:
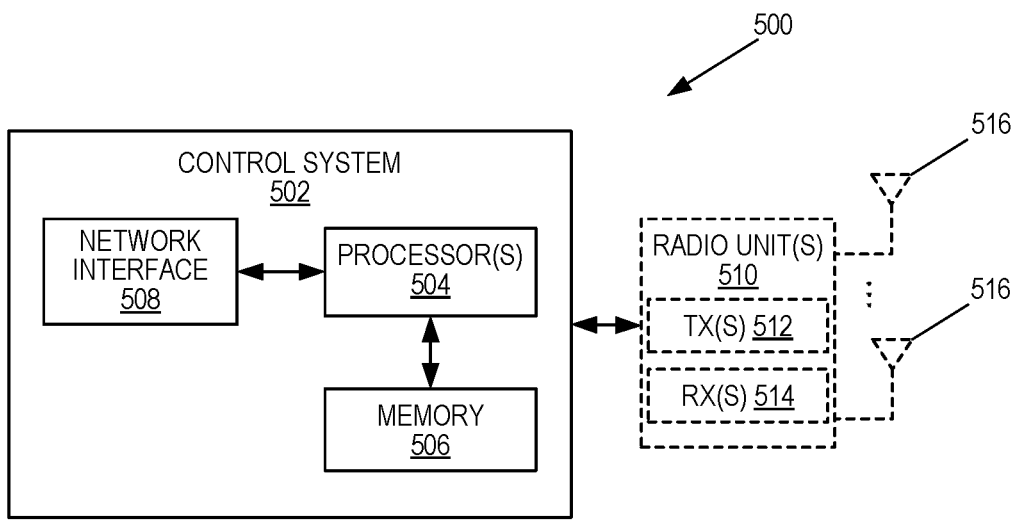
FIGS. 5 through 7 are schematic block diagrams of embodiments of a radio access node.

FIG. 5 is a schematic block diagram of a radio access node 500 according to some embodiments of the present disclosure. Optional features are represented by dashed boxes. The radio access node 500 may be, for example, the base station 102 or 104 or a network node that implements all or part of the functionality of the base station 102 or 104 described herein. As illustrated, the radio access node 500 includes a control system 502 that includes one or more processors 504 (e.g., Central Processing Units (CPUs), Application Specific Integrated Circuits (ASICs), Field Programmable Gate Arrays (FPGAs), and/or the like), memory 506, and a network interface 508. The one or more processors 504 are also referred to herein as processing circuitry. In addition, the radio access node 500 may include one or more radio units 510 that each includes one or more transmitters 512 and one or more receivers 514 coupled to one or more antennas 516. The radio units 510 may be referred to or be part of radio interface circuitry. In some embodiments, the radio unit(s) 510 is external to the control system 502 and connected to the control system 502 via, e.g., a wired connection (e.g., an optical cable). However, in some other embodiments, the radio unit(s) 510 and potentially the antenna(s) 516 are integrated together with the control system 502. The one or more processors 504 operate to provide one or more functions of the radio access node 500 (e.g., one or more functions of the base station 102 or 104) as described herein. In some embodiments, the function(s) are implemented in software that is stored, e.g., in the memory 506 and executed by the one or more processors 504.

Figure 6:
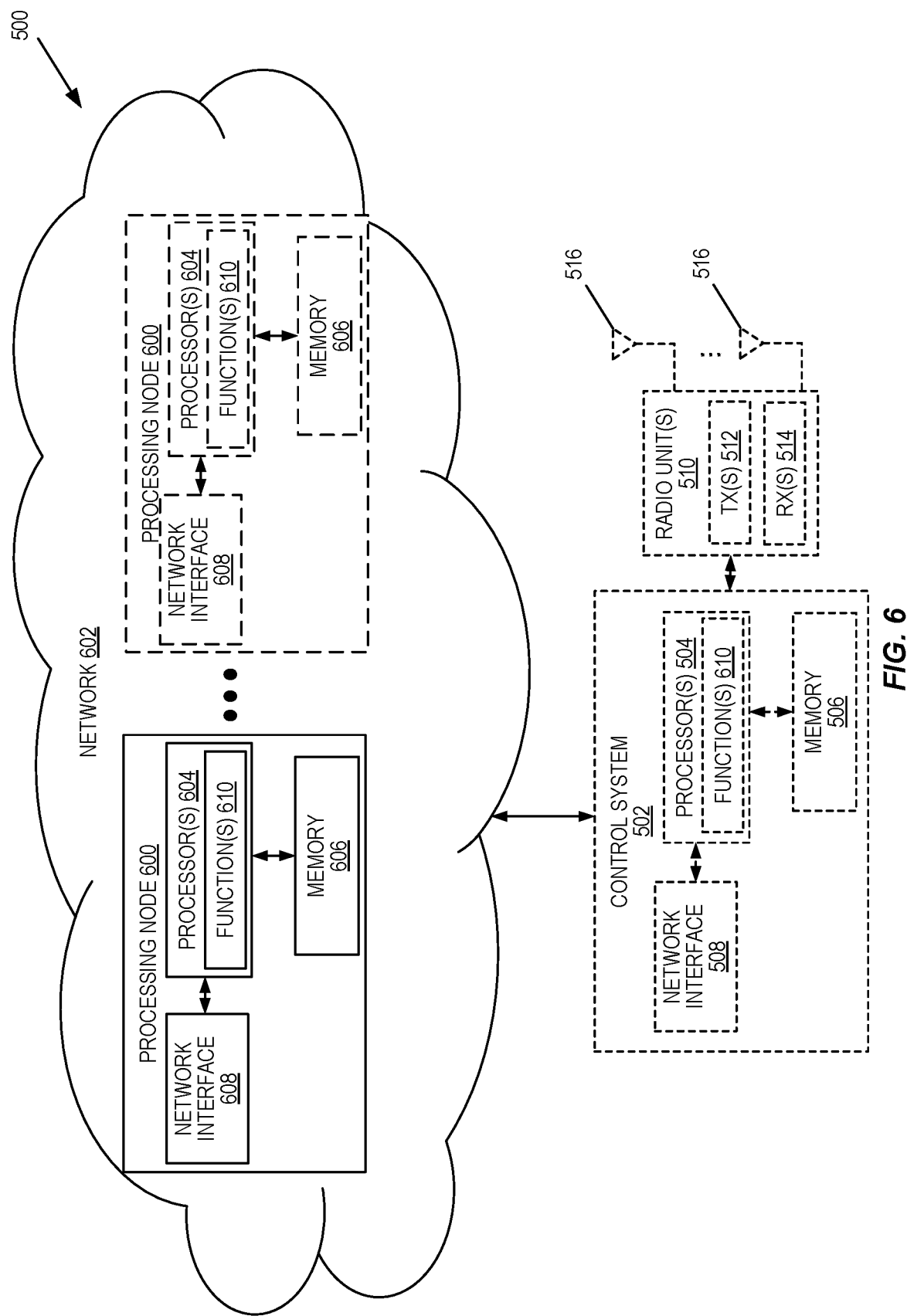

FIG. 6 is a schematic block diagram that illustrates a virtualized embodiment of the radio access node 500 according to some embodiments of the present disclosure. As used herein, a "virtualized" radio access node is an implementation of the radio access node 500 in which at least a portion of the functionality of the radio access node 500 is implemented as a virtual component(s) (e.g., via a virtual machine(s) executing on a physical processing node(s) in a network(s)). As illustrated, in this example, the radio access node 500 may include the control system 502 and/or the one or more radio units 510, as described above. The control system 502 may be connected to the radio unit(s) 510 via, for example, an optical cable or the like. The radio access node 500 includes one or more processing nodes 600 coupled to or included as part of a network(s) 602. If present, the control system 502 or the radio unit(s) are connected to the processing node(s) 600 via the network 602. Each processing node 600 includes one or more processors 604 (e.g., CPUs, ASICs, FPGAs, and/or the like), memory 606, and a network interface 608.

In this example, functions 610 of the radio access node 500 described herein (e.g., one or more functions of the base station 102 or 104) are implemented at the one or more processing nodes 600 or distributed across the one or more processing nodes 600 and the control system 502 and/or the radio unit(s) 510 in any desired manner. In some particular embodiments, some or all of the functions 610 of the radio access node 500 described herein are implemented as virtual components executed by one or more virtual machines implemented in a virtual environment(s) hosted by the processing node(s) 600. As will be appreciated by one of ordinary skill in the art, additional signaling or communication between the processing node(s) 600 and the control system 502 is used in order to carry out at least some of the desired functions 610. Notably, in some embodiments, the control system 502 may not be included, in which case the radio unit(s) 510 communicate directly with the processing node(s) 600 via an appropriate network interface(s).

In some embodiments, a computer program including instructions which, when executed by at least one processor, causes the at least one processor to carry out the functionality of radio access node 500 or a node (e.g., a processing node 600) implementing one or more of the functions 610 of the radio access node 500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 7:
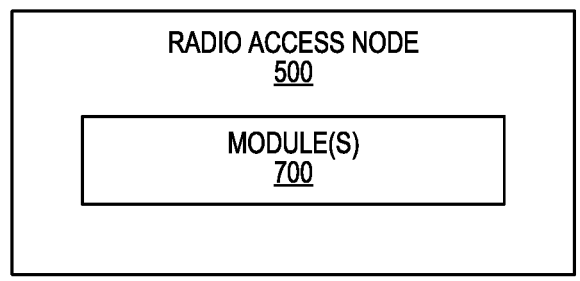

FIG. 7 is a schematic block diagram of the radio access node 500 according to some other embodiments of the present disclosure. The radio access node 500 includes one or more modules 700, each of which is implemented in software. The module(s) 700 provide the functionality of the radio access node 500 described herein (e.g., one or more functions of the base station 102 or 104). This discussion is equally applicable to the processing node 600 of FIG. 6 where the modules 700 may be implemented at one of the processing nodes 600 or distributed across multiple processing nodes 600 and/or distributed across the processing node(s) 600 and the control system 502.

Figure 8:
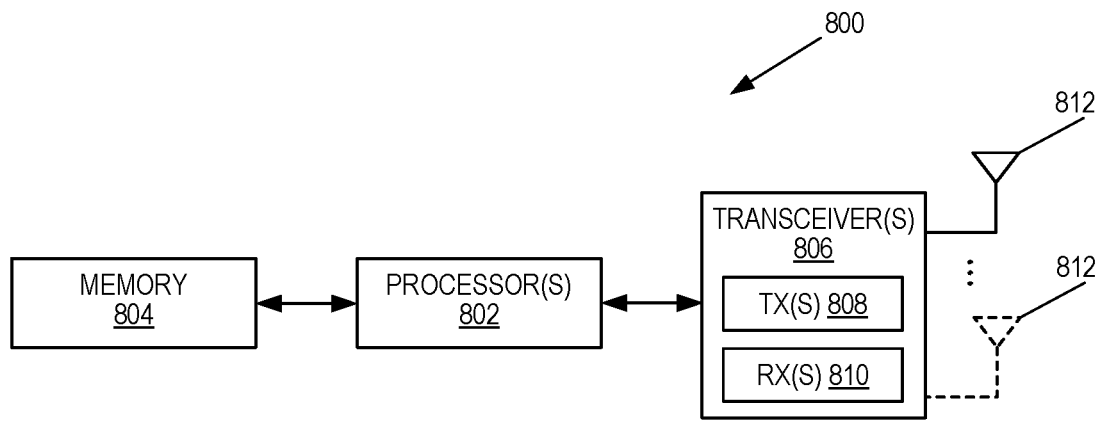
FIGS. 8 and 9 are schematic block diagrams of embodiments of a wireless communication device.

FIG. 8 is a schematic block diagram of a wireless communication device 800 according to some embodiments of the present disclosure. The wireless communication device 800 may be, for example, the wireless communication device 110. As illustrated, the wireless communication device 800 includes one or more processors 802 (e.g., CPUs, ASICs, FPGAs, and/or the like), memory 804, and one or more transceivers 806 each including one or more transmitters 808 and one or more receivers 810 coupled to one or more antennas 812. The transceiver(s) 806 includes radio-front end circuitry connected to the antenna(s) 812 that is configured to condition signals communicated between the antenna(s) 812 and the processor(s) 802, as will be appreciated by on of ordinary skill in the art. The processors 802 are also referred to herein as processing circuitry. The transceivers 806 are also referred to herein as radio circuitry. In some embodiments, the functionality of the wireless communication device 800 described above (e.g., one or more functions of the wireless communication device 110 described above) may be fully or partially implemented in software that is, e.g., stored in the memory 804 and executed by the processor(s) 802. Note that the wireless communication device 800 may include additional components not illustrated in FIG. 8 such as, e.g., one or more user interface components (e.g., an input/output interface including a display, buttons, a touch screen, a microphone, a speaker(s), and/or the like and/or any other components for allowing input of information into the wireless communication device 800 and/or allowing output of information from the wireless communication device 800), a power supply (e.g., a battery and associated power circuitry), etc.

In some embodiments, a computer program including instructions which, when executed by at least one processor, causes the at least one processor to carry out the functionality of the wireless communication device 800 according to any of the embodiments described herein (e.g., one or more functions of the wireless communication device 110 described above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
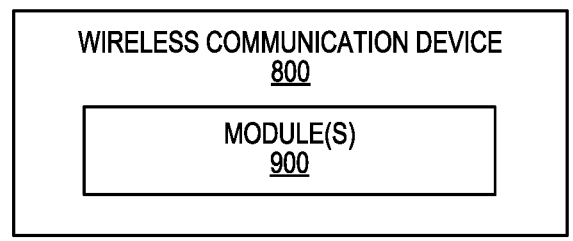

FIG. 9 is a schematic block diagram of the wireless communication device 800 according to some other embodiments of the present disclosure. The wireless communication device 800 includes one or more modules 900, each of which is implemented in software. The module(s) 900 provide the functionality of the wireless communication device 800 described herein (e.g., one or more functions of the wireless communication device 110 described above).

Figure 10:
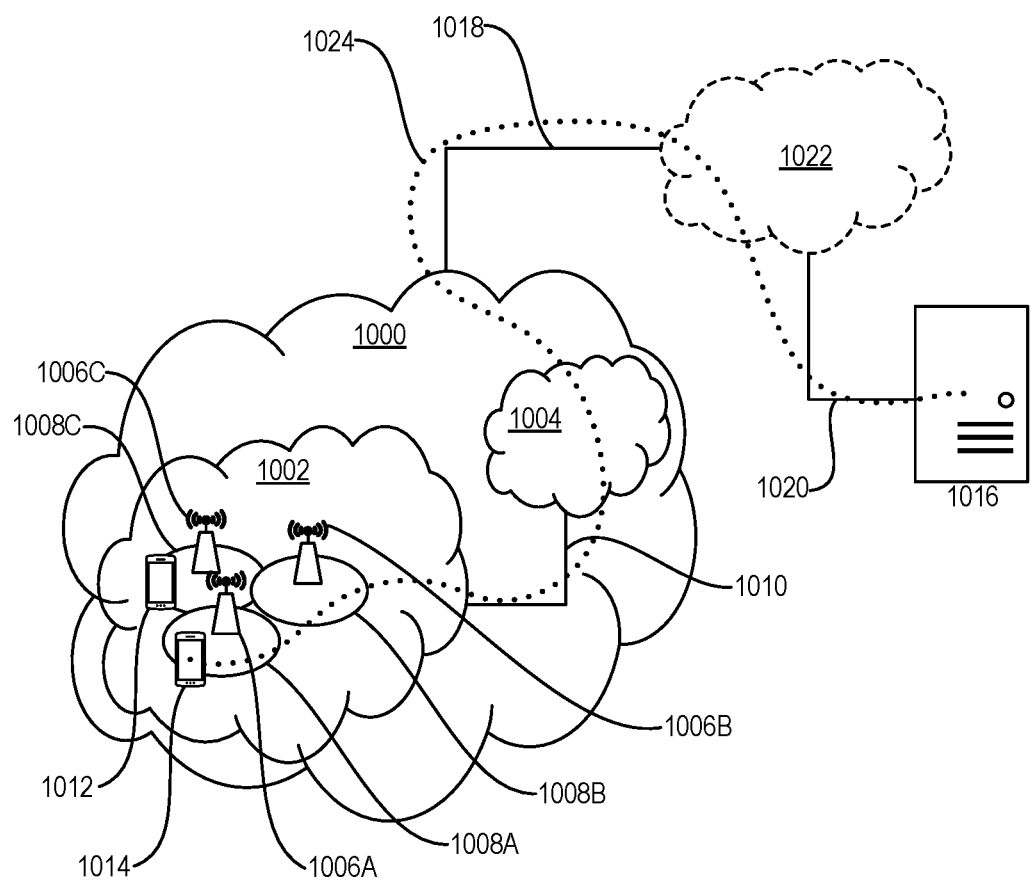
FIG. 10 illustrates a telecommunication network connected via an intermediate network to a host computer in accordance with some embodiments of the present disclosure.

With reference to FIG. 10, in accordance with an embodiment, a communication system includes a telecommunication network 1000, such as a 3GPP-type cellular network, which comprises an access network 1002, such as a RAN, and a core network 1004. The access network 1002 comprises a plurality of base stations 1006A, 1006B, 1006C, such as Node Bs, eNBs, gNBs, or other types of wireless Access Points (APs), each defining a corresponding coverage area 1008A, 1008B, 1008C. Each base station 1006A, 1006B, 1006C is connectable to the core network 1004 over a wired or wireless connection 1010. A first UE 1012 located in coverage area 1008C is configured to wirelessly connect to, or be paged by, the corresponding base station 1006C. A second UE 1014 in coverage area 1008A is wirelessly connectable to the corresponding base station 1006A. While a plurality of UEs 1012, 1014 are illustrated in this example, the disclosed embodiments are equally applicable to a situation where a sole UE is in the coverage area or where a sole UE is connecting to the corresponding base station 1006.

The telecommunication network 1000 is itself connected to a host computer 1016, which may be embodied in the hardware and/or software of a standalone server, a cloud-implemented server, a distributed server, or as processing resources in a server farm. The host computer 1016 may be under the ownership or control of a service provider, or may be operated by the service provider or on behalf of the service provider. Connections 1018 and 1020 between the telecommunication network 1000 and the host computer 1016 may extend directly from the core network 1004 to the host computer 1016 or may go via an optional intermediate network 1022. The intermediate network 1022 may be one of, or a combination of more than one of, a public, private, or hosted network; the intermediate network 1022, if any, may be a backbone network or the Internet; in particular, the intermediate network 1022 may comprise two or more sub-networks (not shown).

The communication system of FIG. 10 as a whole enables connectivity between the connected UEs 1012, 1014 and the host computer 1016. The connectivity may be described as an Over-the-Top (OTT) connection 1024. The host computer 1016 and the connected UEs 1012, 1014 are configured to communicate data and/or signaling via the OTT connection 1024, using the access network 1002, the core network 1004, any intermediate network 1022, and possible further infrastructure (not shown) as intermediaries. The OTT connection 1024 may be transparent in the sense that the participating communication devices through which the OTT connection 1024 passes are unaware of routing of uplink and downlink communications. For example, the base station 1006 may not or need not be informed about the past routing of an incoming downlink communication with data originating from the host computer 1016 to be forwarded (e.g., handed over) to a connected UE 1012. Similarly, the base station 1006 need not be aware of the future routing of an outgoing uplink communication originating from the UE 1012 towards the host computer 1016.

Example implementations, in accordance with an embodiment, of the UE, base station, and host computer discussed in the preceding paragraphs will now be described with reference to FIG. 11. In a communication system 1100, a host computer 1102 comprises hardware 1104 including a communication interface 1106 configured to set up and maintain a wired or wireless connection with an interface of a different communication device of the communication system 1100. The host computer 1102 further comprises processing circuitry 1108, which may have storage and/or processing capabilities. In particular, the processing circuitry 1108 may comprise one or more programmable processors, ASICs, FPGAs, or combinations of these (not shown) adapted to execute instructions. The host computer 1102 further comprises software 1110, which is stored in or accessible by the host computer 1102 and executable by the processing circuitry 1108. The software 1110 includes a host application 1112. The host application 1112 may be operable to provide a service to a remote user, such as a UE 1114 connecting via an OTT connection 1116 terminating at the UE 1114 and the host computer 1102. In providing the service to the remote user, the host application 1112 may provide user data which is transmitted using the OTT connection 1116.

The communication system 1100 further includes a base station 1118 provided in a telecommunication system and comprising hardware 1120 enabling it to communicate with the host computer 1102 and with the UE 1114. The hardware 1120 may include a communication interface 1122 for setting up and maintaining a wired or wireless connection with an interface of a different communication device of the communication system 1100, as well as a radio interface 1124 for setting up and maintaining at least a wireless connection 1126 with the UE 1114 located in a coverage area (not shown in FIG. 11) served by the base station 1118. The communication interface 1122 may be configured to facilitate a connection 1128 to the host computer 1102. The connection 1128 may be direct or it may pass through a core network (not shown in FIG. 11) of the telecommunication system and/or through one or more intermediate networks outside the telecommunication system. In the embodiment shown, the hardware 1120 of the base station 1118 further includes processing circuitry 1130, which may comprise one or more programmable processors, ASICs, FPGAs, or combinations of these (not shown) adapted to execute instructions. The base station 1118 further has software 1132 stored internally or accessible via an external connection.

The communication system 1100 further includes the UE 1114 already referred to. The UE's 1114 hardware 1134 may include a radio interface 1136 configured to set up and maintain a wireless connection 1126 with a base station serving a coverage area in which the UE 1114 is currently located. The hardware 1134 of the UE 1114 further includes processing circuitry 1138, which may comprise one or more programmable processors, ASICs, FPGAs, or combinations of these (not shown) adapted to execute instructions. The UE 1114 further comprises software 1140, which is stored in or accessible by the UE 1114 and executable by the processing circuitry 1138. The software 1140 includes a client application 1142. The client application 1142 may be operable to provide a service to a human or non-human user via the UE 1114, with the support of the host computer 1102. In the host computer 1102, the executing host application 1112 may communicate with the executing client application 1142 via the OTT connection 1116 terminating at the UE 1114 and the host computer 1102. In providing the service to the user, the client application 1142 may receive request data from the host application 1112 and provide user data in response to the request data. The OTT connection 1116 may transfer both the request data and the user data. The client application 1142 may interact with the user to generate the user data that it provides.

Figure 11:
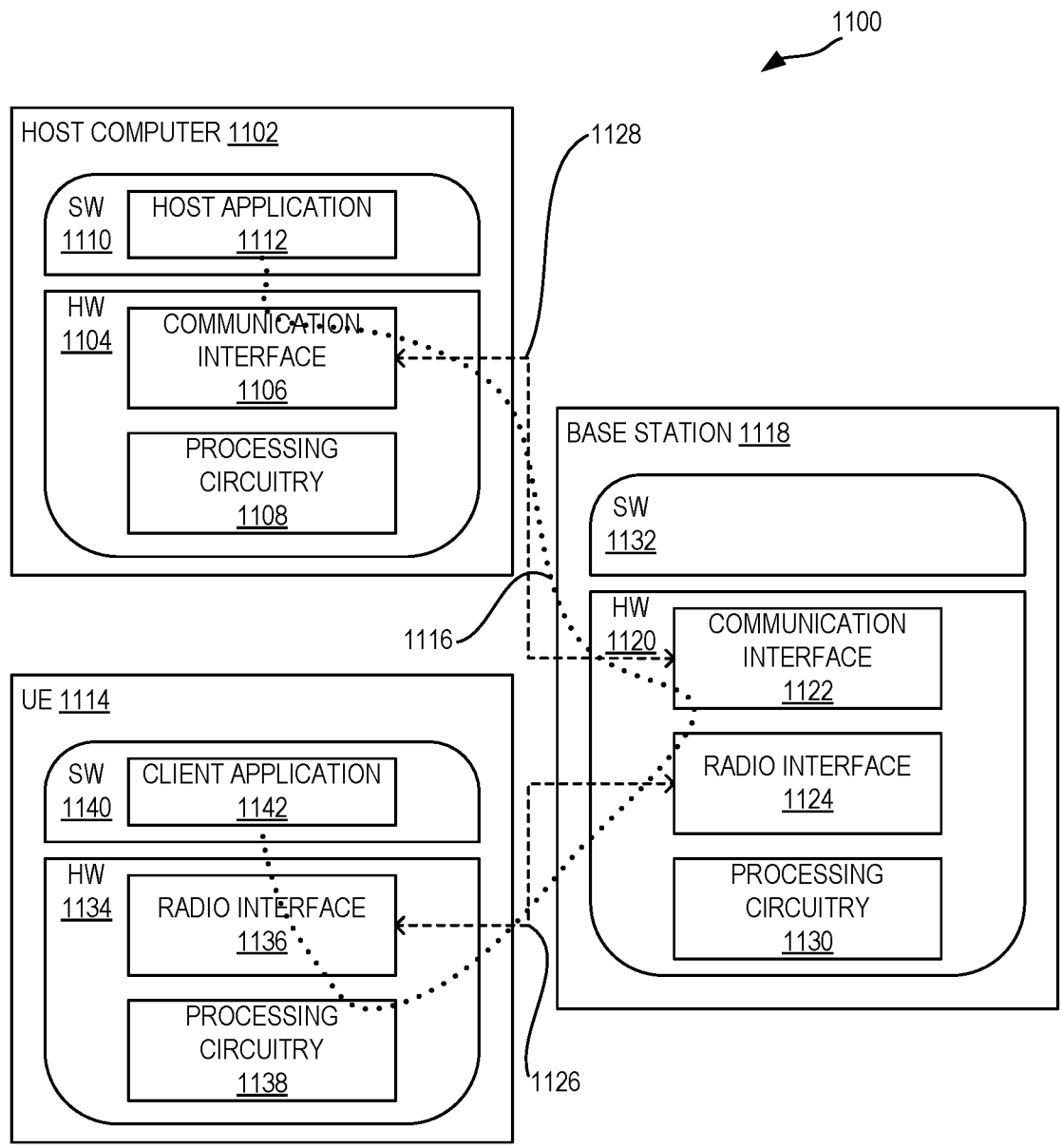
FIG. 11 is a generalized block diagram of a host computer communicating via a base station with a UE over a partially wireless connection in accordance with some embodiments of the present disclosure.

It is noted that the host computer 1102, the base station 1118, and the UE 1114 illustrated in FIG. 11 may be similar or identical to the host computer 1016, one of the base stations 1006A, 1006B, 1006C, and one of the UEs 1012, 1014 of FIG. 10, respectively. This is to say, the inner workings of these entities may be as shown in FIG. 11 and independently, the surrounding network topology may be that of FIG. 10.

In FIG. 11, the OTT connection 1116 has been drawn abstractly to illustrate the communication between the host computer 1102 and the UE 1114 via the base station 1118 without explicit reference to any intermediary devices and the precise routing of messages via these devices. The network infrastructure may determine the routing, which may be configured to hide from the UE 1114 or from the service provider operating the host computer 1102, or both. While the OTT connection 1116 is active, the network infrastructure may further take decisions by which it dynamically changes the routing (e.g., on the basis of load balancing consideration or reconfiguration of the network).

The wireless connection 1126 between the UE 1114 and the base station 1118 is in accordance with the teachings of the embodiments described throughout this disclosure. One or more of the various embodiments improve the performance of OTT services provided to the UE 1114 using the OTT connection 1116, in which the wireless connection 1126 forms the last segment. More precisely, the teachings of these embodiments may improve reliability and thereby provide benefits such as, e.g., reduced user waiting time, better responsiveness, or the like.

A measurement procedure may be provided for the purpose of monitoring data rate, latency, and other factors on which the one or more embodiments improve. There may further be an optional network functionality for reconfiguring the OTT connection 1116 between the host computer 1102 and the UE 1114, in response to variations in the measurement results. The measurement procedure and/or the network functionality for reconfiguring the OTT connection 1116 may be implemented in the software 1110 and the hardware 1104 of the host computer 1102 or in the software 1140 and the hardware 1134 of the UE 1114, or both. In some embodiments, sensors (not shown) may be deployed in or in association with communication devices through which the OTT connection 1116 passes; the sensors may participate in the measurement procedure by supplying values of the monitored quantities exemplified above, or supplying values of other physical quantities from which the software 1110, 1140 may compute or estimate the monitored quantities. The reconfiguring of the OTT connection 1116 may include message format, retransmission settings, preferred routing, etc.; the reconfiguring need not affect the base station 1118, and it may be unknown or imperceptible to the base station 1118. Such procedures and functionalities may be known and practiced in the art. In certain embodiments, measurements may involve proprietary UE signaling facilitating the host computer's 1102 measurements of throughput, propagation times, latency, and the like. The measurements may be implemented in that the software 1110 and 1140 causes messages to be transmitted, in particular empty or 'dummy' messages, using the OTT connection 1116 while it monitors propagation times, errors, etc.

Figures 12, 13:
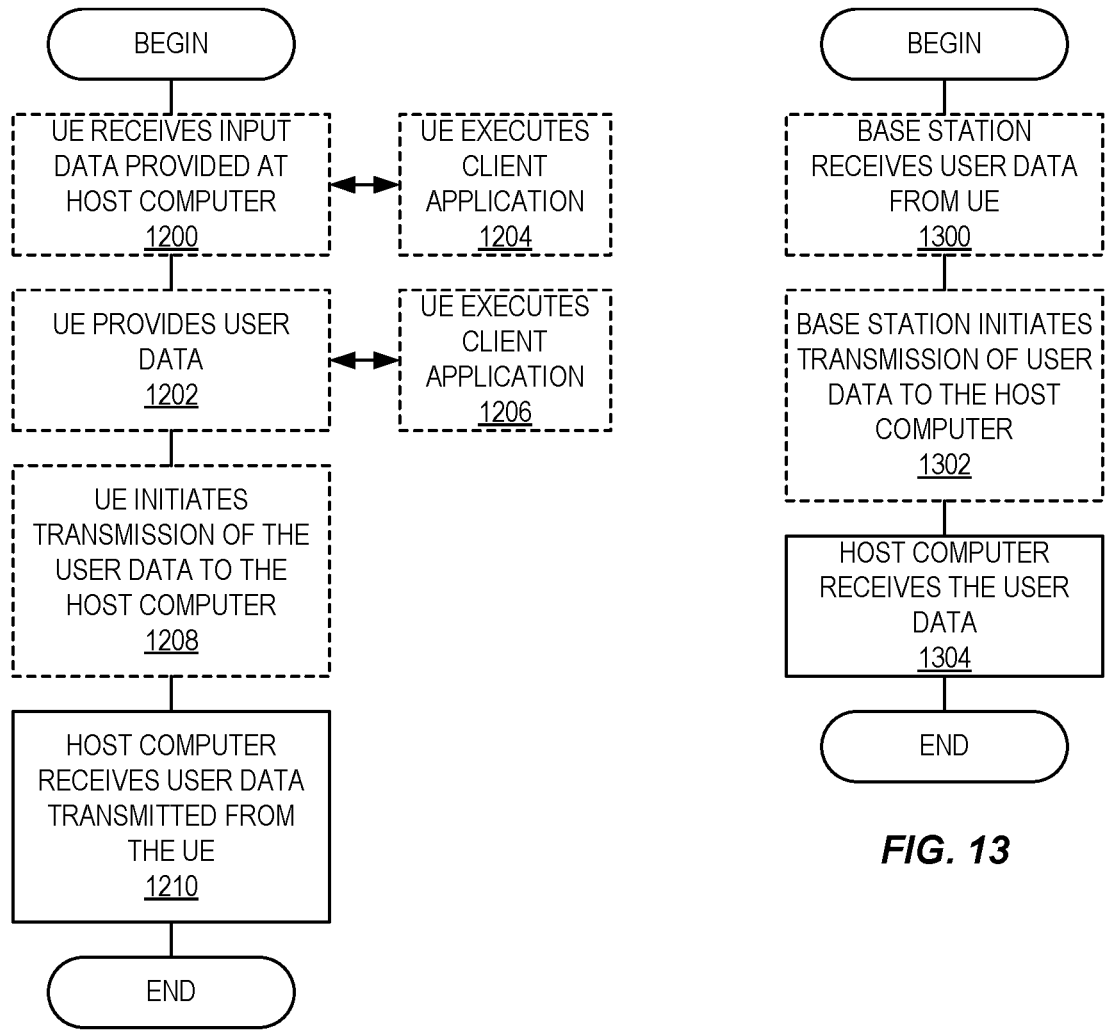
FIG. 12 is a flowchart illustrating a method implemented in a communication system in accordance with one embodiment of the present disclosure.
FIG. 13 is a flowchart illustrating a method implemented in a communication system in accordance with one embodiment of the present disclosure.

FIG. 12 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 12 will be included in this section. In step 1200 (which may be optional), the UE receives input data provided by the host computer. Additionally or alternatively, in step 1202, the UE provides user data. In sub-step 1204 (which may be optional) of step 1200, the UE provides the user data by executing a client application. In sub-step 1206 (which may be optional) of step 1202, the UE executes a client application which provides the user data in reaction to the received input data provided by the host computer. In providing the user data, the executed client application may further consider user input received from the user. Regardless of the specific manner in which the user data was provided, the UE initiates, in sub-step 1208 (which may be optional), transmission of the user data to the host computer. In step 1210 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station, and a UE which may be those described with reference to FIGS. 10 and 11. For simplicity of the present disclosure, only drawing references to FIG. 13 will be included in this section. In step 1300 (which may be optional), in accordance with the teachings of the embodiments described throughout this disclosure, the base station receives user data from the UE. In step 1302 (which may be optional), the base station initiates transmission of the received user data to the host computer. In step 1304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CA Carrier Aggregation
CC Component Carrier
CE Control Element
CPU Central Processing Unit
DC Dual Connectivity
DN Data Network
DRB Data Radio Bearer
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MAC Medium Access Control
MCG Master Cell Group
MgNB Master New Radio Base Station
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCell Primary Cell
PCF Policy Control Function
PDCP Packet Data Convergence Protocol
PDU Protocol Data Unit
P-GW Packet Data Network Gateway
PSCell Primary Secondary Cell
QoS Quality of Service
RAM Random Access Memory
RAN Radio Access Network
ROM Read Only Memory
RRC Radio Resource Control
RRH Remote Radio Head
RTT Round Trip Time
SCEF Service Capability Exposure Function
SCell Secondary Cell
SgNB Secondary New Radio Base Station
SMF Session Management Function
TCI Transmission Configuration Indicator
TRP Transmission/Reception Point
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless communication device for a cellular communications system, the method comprising:
    operating, together with a first base station, to be configured for Carrier Aggregation, CA, with a Primary Cell, PCell, served by the first base station and a Secondary Cell, SCell, served by a second base station;
    operating, together with the first base station, to configure a first Data Radio Bearer, DRB, associated to a first logical channel and a second DRB associated to a second logical channel;
    receiving a first parameter that indicates that transmission for the first logical channel that is associated to the first DRB is restricted to the SCell and a second parameter that indicates that transmission for the second logical channel that is associated to the second DRB is restricted to the PCell;
    receiving an uplink, UL, grant for the SCell;
    selecting first data only from the first logical channel that is associated to the first DRB for transmission using the UL grant for the SCell in accordance with the first and second parameters;
    transmitting the selected first data on the SCell in accordance with the UL grant for the SCell;
    receiving a dynamic indication that the SCell is deactivated for the wireless communication device;
    receiving a UL grant for the PCell;
    selecting second data from either the first logical channel that is associated to the first DRB or the second logical channel that is associated to the second DRB for transmission using the UL grant for the PCell, regardless of the first and second parameters; and
    transmitting the selected second data on the PCell in accordance with the UL grant for the PCell.

2. The method of claim 1 wherein the dynamic indication that the SCell is deactivated for the wireless communication device serves as an implicit indication that a mapping restriction defined by the first and second parameters is lifted such that data from the first logical channel that is associated to the first DRB can be mapped to the PCell.

3. The method of claim 1 wherein the dynamic indication that the SCell is deactivated for the wireless communication device is comprised in a Medium Access Control, MAC, Control Element, CE.

4. The method of claim 1 wherein the first parameter is an allowedServingCells parameter for the first logical channel, and the second parameter is an allowedServingCells parameter for the second logical channel.

5. The method of claim 1 further comprising:
    receiving a dynamic indication that the SCell is activated for the wireless communication device; and after receiving the dynamic indication that the SCell is activated for the wireless communication device:
receiving a second UL grant for the SCell;
selecting third data only from the first logical channel that is associated to the first DRB for transmission using the second UL grant for the SCell in accordance with the first and second parameters; and
transmitting the selected third data on the SCell in accordance with the second UL grant for the SCell.

6. The method of claim 5 wherein the dynamic indication that the SCell is activated for the wireless communication device serves as an implicit indication that a mapping restriction defined by the first and second parameters is activated such that data from the first logical channel that is associated to the first DRB can only be mapped to the SCell.

7. A method performed by a first base station for a cellular communications system, the method comprising:
operating, together with a wireless communication device, to configure the wireless communication device for Carrier Aggregation, CA, with a Primary Cell, PCell, served by the first base station and a Secondary Cell, SCell, served by a second base station;
operating, together with the wireless communication device, to configure the wireless communication device with a first Data Radio Bearer, DRB, associated to a first logical channel and a second DRB associated to a second logical channel;
sending, to the wireless communication device, a first parameter that indicates that transmission for the first logical channel that is associated to the first DRB is restricted to the SCell and a second parameter that indicates that transmission for the second logical channel that is associated to the second DRB is restricted to the PCell;
determining that a link quality for the wireless communication device on the SCell is less than a predefined link quality threshold; and
responsive to determining that the link quality for the wireless communication device on the SCell is less than the predefined link quality threshold, sending, to the wireless communication device, a dynamic indication that the SCell is deactivated for the wireless communication device, the dynamic indication that the SCell is deactivated for the wireless communication device being an implicit indication that transmission of data on the PCell can be either data for the first DRB or data for the second DRB regardless of the first and second parameters.

8. The method of claim 7 further comprising, while the SCell is deactivated, sending, to the wireless communication device, an uplink, UL, grant for the PCell, where transmission of data on the PCell responsive to the UL grant for the PCell can be either data for the first DRB or data for the second DRB regardless of the first and second parameters.

9. The method of claim 7 wherein the dynamic indication that the SCell is deactivated for the wireless communication device is comprised in a Medium Access Control, MAC, Control Element, CE.

10. The method of claim 7 wherein the first parameter is an allowedServingCells parameter for the first logical channel, and the second parameter is an allowedServingCells parameter for the second logical channel.

11. The method of claim 7 further comprising:
determining that a link quality for the wireless communication device on the SCell is greater than a predefined link quality threshold; and
responsive to determining that the link quality for the wireless communication device on the SCell is greater than the predefined link quality threshold, sending, to the wireless communication device, a dynamic indication that the SCell is activated for the wireless communication device, the dynamic indication that the SCell is activated for the wireless communication device being an implicit indication that transmission for the first logical channel that is associated to the first DRB is restricted to the SCell in accordance with the first parameter and that transmission for the second logical channel that is associated to the second DRB is restricted to the PCell in accordance with the second parameter.

12. A wireless communication device for a cellular communications system, the wireless communication device comprising:
one or more transmitters;
one or more receivers;
processing circuitry associated with the one or more transmitters and the one or more receivers, the processing circuitry configured to cause the wireless communication device to:
operate, together with a first base station, to be configured for Carrier Aggregation, CA, with a Primary Cell, PCell, served by the first base station and a Secondary Cell, SCell, served by a second base station;
operate, together with the first base station, to configure a first Data Radio Bearer, DRB, associated to a first logical channel and a second DRB associated to a second logical channel;
receive a first parameter that indicates that transmission for the first logical channel that is associated to the first DRB is restricted to the SCell and a second parameter that indicates that transmission for the second logical channel that is associated to the second DRB is restricted to the PCell;
receive an uplink, UL, grant for the SCell;
select first data only from the first logical channel that is associated to the first DRB for transmission using the UL grant for the SCell in accordance with the first and second parameters;
transmit the selected first data on the SCell in accordance with the UL grant for the SCell;
receive a dynamic indication that the SCell is deactivated for the wireless communication device;
receive a UL grant for the PCell;
select second data from either the first logical channel that is associated to the first DRB or the second logical channel that is associated to the second DRB for transmission using the UL grant for the PCell, regardless of the first and second parameters; and
transmit the selected second data on the PCell in accordance with the UL grant for the PCell.

13. The wireless communication device of claim 12, wherein the dynamic indication that the SCell is deactivated for the wireless communication device serves as an implicit indication that a mapping restriction defined by the first and second parameters is lifted such that data from the first logical channel that is associated to the first DRB can be mapped to the PCell.

14. The wireless communication device of claim 12, wherein the dynamic indication that the SCell is deactivated for the wireless communication device is comprised in a Medium Access Control, MAC, Control Element, CE.

15. The wireless communication device of claim 12, wherein the first parameter is an allowedServingCells parameter for the first logical channel, and the second parameter is an allowedServingCells parameter for the second logical channel.

16. A first base station for a cellular communications system, the first base station comprising processing circuitry configured to cause the first base station to:
operate, together with a wireless communication device, to configure the wireless communication device for Carrier Aggregation, CA, with a Primary Cell, PCell, served by the first base station and a Secondary Cell, SCell, served by a second base station;
operate, together with the wireless communication device, to configure the wireless communication device with a first Data Radio Bearer, DRB, associated to a first logical channel and a second DRB associated to a second logical channel;
send, to the wireless communication device, a first parameter that indicates that transmission for the first logical channel that is associated to the first DRB is restricted to the SCell and a second parameter that indicates that transmission for the second logical channel that is associated to the second DRB is restricted to the PCell;
determine that a link quality for the wireless communication device on the SCell is less than a predefined link quality threshold; and
responsive to determining that the link quality for the wireless communication device on the SCell is less than the predefined link quality threshold, send, to the wireless communication device, a dynamic indication that the SCell is deactivated for the wireless communication device, the dynamic indication that the SCell is deactivated for the wireless communication device being an implicit indication that transmission of data on the PCell can be either data for the first DRB or data for the second DRB regardless of the first and second parameters.

17. The first base station of claim 16, wherein the processing circuitry is further configured to cause the first base station to, while the SCell is deactivated, send, to the wireless communication device, an uplink, UL, grant for the PCell, where transmission of data on the PCell responsive to the UL grant for the PCell can be either data for the first DRB or data for the second DRB regardless of the first and second parameters.

18. The first base station of claim 16, wherein the dynamic indication that the SCell is deactivated for the wireless communication device is comprised in a Medium Access Control, MAC, Control Element, CE.

19. The first base station of claim 16, wherein the first parameter is an allowedServingCells parameter for the first logical channel, and the second parameter is an allowedServingCells parameter for the second logical channel.

20. The first base station of claim 16, wherein the processing circuitry is further configured to cause the first base station to:
determine that a link quality for the wireless communication device on the SCell is greater than a predefined link quality threshold; and
responsive to determining that the link quality for the wireless communication device on the SCell is greater than the predefined link quality threshold, send, to the wireless communication device, a dynamic indication that the SCell is activated for the wireless communication device, the dynamic indication that the SCell is activated for the wireless communication device being an implicit indication that transmission for the first logical channel that is associated to the first DRB is restricted to the SCell in accordance with the first parameter and that transmission for the second logical channel that is associated to the second DRB is restricted to the PCell in accordance with the second parameter.

* * * * *